United States Patent
Takeuchi et al.

(10) Patent No.: US 6,485,275 B1
(45) Date of Patent: Nov. 26, 2002

(54) DEVICE FOR DISCHARGING RAW MATERIAL-FUEL

(75) Inventors: Yukihisa Takeuchi, Nishikamo-gun (JP); Nobuo Takahashi, Owariasahi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/719,954

(22) PCT Filed: Jun. 30, 1999

(86) PCT No.: PCT/JP99/03509
§ 371 (c)(1),
(2), (4) Date: Dec. 18, 2000

(87) PCT Pub. No.: WO00/01460
PCT Pub. Date: Jan. 13, 2000

(30) Foreign Application Priority Data

Jul. 2, 1998 (JP) ............................................. 10-187810

(51) Int. Cl.[7] .................................................. F04B 17/00
(52) U.S. Cl. ..................................... 417/413.2; 417/322
(58) Field of Search ............................. 417/322, 413.2, 417/413.3; 422/103; 436/180

(56) References Cited

U.S. PATENT DOCUMENTS

| | | | | |
|---|---|---|---|---|
| 3,940,773 A | * | 2/1976 | Mizoguchi et al. | 346/140 R |
| 4,353,078 A | * | 10/1982 | Lee et al. | 346/140 R |
| 4,695,854 A | | 9/1987 | Cruz-Uribe | 346/140 R |
| 4,835,554 A | * | 5/1989 | Hoisington et al. | 346/140 R |
| 5,219,278 A | * | 6/1993 | van Lintel | 417/413 R |
| 6,017,117 A | * | 1/2000 | McClelland et al. | 374/84 |

FOREIGN PATENT DOCUMENTS

| | | | |
|---|---|---|---|
| EP | 0 168 656 | * | 1/1986 |
| EP | 0 572 231 B1 | | 12/1993 |
| JP | 58108158 A | * | 6/1983 |
| JP | 61-105150 | | 7/1986 |
| JP | 3-253345 | | 12/1991 |
| JP | 6-40030 | | 2/1994 |
| JP | 07314670 A | * | 12/1995 |
| JP | 11048475 A | * | 2/1999 |
| JP | 11-314030 | | 11/1999 |

* cited by examiner

Primary Examiner—Charles G. Freay
Assistant Examiner—Han Lieh Liu
(74) Attorney, Agent, or Firm—Burr & Brown

(57) ABSTRACT

A device for discharging a liquid raw material(fuel) is provided, including a structure for discharging liquid having at least a pressurizing means for discharging liquid, a pressure chamber, a flow path communicating with the pressure chamber, and an air bubble trap cell communicating with the pressure chamber via the flow path. According to this device, a trapped air bubble can be securely released.

9 Claims, 2 Drawing Sheets

DEVICE FOR DISCHARGING RAW MATERIAL-FUEL

TECHNICAL FIELD

The present invention relates to a device for discharging liquid raw material (fuel) used for operating various machines by discharging liquid raw material or fuel, or for various machines for treating the liquid by discharging liquid raw material or fuel.

BACKGROUND OF THE INVENTION

A liquid discharge device is disclosed in, for example, JP-A-6-40030. However, in some modes of use thereof, air bubbles formed by mechanical vibrations, which occur depending on use environment, penetrate into a pressure application room of a liquid discharge device. The penetrating air bubbles transform depending on pressure and absorb a part of, or all of, the applied pressure, even if the pressure application room is pressurized. Thereby, the aimed discharging of liquid often cannot be performed as intended. Thus, there was a problem that the desired effect was not seen.

The present invention aims to provide a device for discharging liquid raw material (fuel) comprising a structure that can securely eject the air bubbles which penetrate into the liquid discharge device so as not to cause discharge defects or the inability to discharge due to such penetrated air bubbles.

SUMMARY OF THE INVENTION

The present inventors have studied various ways in view of the present situations, and as a result, found that the absorption of pressure by penetrated air bubbles can be substantially eliminated by providing an air bubble trap cell for trapping air bubbles generated by mechanical vibrations or the like via a flow path communicating with a pressure application room. Additionally, the trapped air bubbles can be ejected outside the cell by providing an element for making the pressure, $p_1$, in the air bubble trap cell higher than external atmospheric pressure $p_0$ outside the device upon discharge of liquid, and thus, the present invention was provided.

According to the present invention, a device for discharging raw material (fuel) is provided, comprising a structure for discharging liquid having at least a pressurizing means for discharging liquid, a pressure application room which is a temporary storage means for liquid to be discharged, a flow path communicating with the pressure application room, and an air bubble trap cell communicating with. the pressure application room via the flow path.

DETAILED DESCRIPTION OF THE INVENTION

The present invention is hereinbelow described in detail with reference to the drawings.

Figure 1:
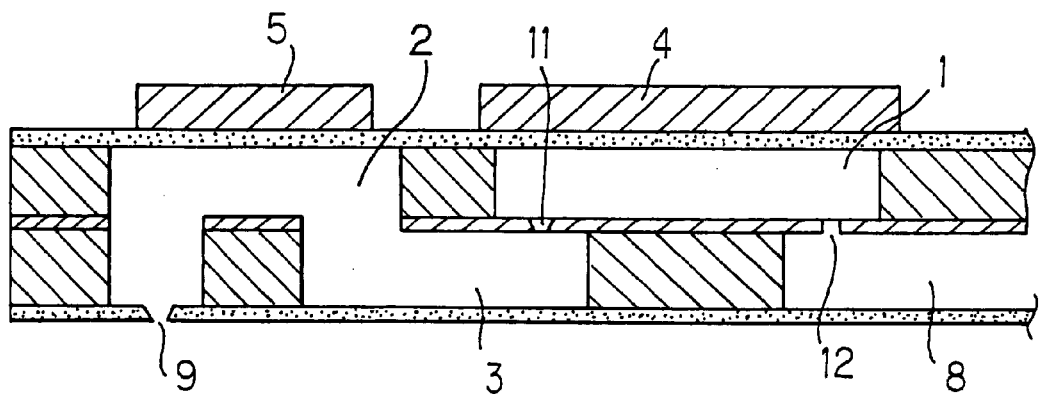
FIG. 1 is a side elevation of an embodiment of a device for discharging a raw material (fuel) (hereinbelow referred to as a liquid discharge device) of the present invention.

FIG. 1 is a side elevation of a mode of a device for discharging raw material (fuel) (a liquid discharge device) of the present invention. A device for discharging raw material (fuel) of the present invention comprises a structure for discharging liquid having at least a pressurizing means (4) for discharging liquid, a pressure application room (1) which is a temporary storage means for liquid to be discharged, a flow path (3) communicating with the pressure application room (1), and an air bubble trap cell (2) communicating with the pressure application room (1) via the flow path (3).

Several units to hundreds of units of liquid raw material/fuel discharge devices each, as one unit, having the above structure for discharging liquid, include at least a pressurizing means for discharging liquid, a pressure application room (1) which is a temporary storage means for liquid to be discharged, a flow path (3) communicating with the pressure application room (1), and an air bubble trap cell (2) communicating with the pressure application room (1) via the flow path (3) and may constitute a raw material / fuel discharge device depending on the mode of use.

The above structure generally includes two structures accumulated into two levels in view of the compression of a device. The pressure application room (1) and the air bubble trap cell (2) are located in the first layer separated via a partition wall, and the flow path (3) communicating with the pressure application room is located in the second layer that is located under the first layer. One end of the flow path (3) is located under the pressure application room, and the other end is located under the pressure application room (1) and the air bubble trap cell (2). Between the cells are provided minute holes (11) and (12) for preventing countercurrent to communicate to transmit liquid to one direction, respectively. Liquid is transmitted through the minute holes for preventing countercurrent.

As a pressurizing means to discharge liquid, a piezoelectric/electrostrictive membranous element (4) is adopted usually. A piezoelectric/electrostrictive membranous element is well-known to people of ordinary skill in the art. A method for installing the may be performed in accordance with well-known methods.

In a liquid discharge device of the present invention, it is preferable that a piezoelectric/electrostrictive membranous element (5) is disposed above the air bubble trap cell (2), so that pressure can be applied to the air bubble trap cell (2) independently from the pressure application room (1) in order to promote discharge of air bubbles by pressure applied to the pressure application room (1). By adopting such a configuration, the air bubbles trapped by the cell (2) are pushed outside, and absorption of pressure for pressurization by the air bubbles can be avoided.

In a liquid discharge device of the present invention, the structure for discharging liquid, formed as a multilayered structure, can be produced by unitarily firing a compact obtained by employing ceramic materials into a predetermined shape in accordance with a method disclosed in Paragraphs 0010–0013 of Japanese Patent Application No. 9-335210.

The liquid discharge device is produced by unitarily firing a structure which can be obtained by stacking up a plate, formed by a green sheet, which is the blocking plate to be the lid of the liquid discharge device, a spacer plate, formed by a green sheet, having window portions which serve as a pressure application room or an air bubble trap cell at predetermined points, respectively. Further, a plate formed by a green sheet for definition and having two minute holes for preventing countercurrents is also stacked, as well as a spacer plate formed by a green sheet having window portions which serve as a liquid distribution tank for discharge or a flow path, and a nozzle plate which is a nozzle portion formed by a thin flat board-shaped green sheet.

The pressure application room (1) communicates with a flow path (3) via a minute hole (11) for preventing countercurrent) and is adjacent to the flow path (3) in order to supplement the liquid to be discharged as desired, and further communicates with a liquid distribution tank for discharge (8) provided via a partition wall via a minute hole (12) for preventing countercurrent.

The pressure application room (1) has a shape such as cylindrical, elliptic cylindrical, rectangular, or the like. The capacity is determined according to the mode of use.

It is preferable that the air bubble trap cell (2) has an elliptic cylindrical shape, or the like, with which the internal flow speed is easily raised while discharging liquid. It is preferable that the capacity of the air bubble trap cell (2) is smaller than that of the pressure application room (1), and it is preferably 1:2 or more, and more preferably, 1:4 or more.

The reason to make the capacity of the air bubble trap cell (2) smaller than the capacity of the pressure application room (1) is that even if a relatively weak pressure, sufficient to make a pressure application room (1) discharge liquid, is applied, the flow speed in the air bubble trap cell (2) can be made sufficient for release of the trapped air bubble. Incidentally, the trapped air bubble can be prevented from passing through the flow path (3) and entering into the pressure application room (1) by making pressure pi in the air bubble trap cell (2) less than pressure $p_2$ of the pressure application room.

It is necessary to keep pressure $p_1$ in the air bubble trap cell (2) higher than atmospheric pressure p0 outside the device to effectively release the effectively trapped air bubble outside the device. For that purpose, the volume ratio of the pressure application room (1) to the air bubble trap cell (2) should be at least 1:4 or more, so that the larger pressurization force is easily obtained by enlarging the pressure application room (1), or a piezoelectric/ electrostrictive membranous element (5) is provided over the air bubble trap cell.

Incidentally, to remove the air bubbles more securely, the pressure conveyed by the pressure application room and the pressure application by the operation of the piezoelectric/ electrostrictive membranous element (5) provided over the air bubble trap cell (2) are made to work together by operating a piezoelectric/electrostrictive membranous element (4) provided in the upper part of a pressure application room (1) with time difference ranging from several microseconds to several tenths of micro-seconds from the piezoelectric/electrostrictive membranous element (5) provided over the air bubble trap cell (2).

The time difference in operation between both piezoelectric/electrostrictive membranous elements (4) and (5) can be conducted by a combination of a CPU and a relay circuit (not shown), a delay circuit (not shown), or the like.

The flow path (3) is provided so that the almost central portion of the flow path (3) is located under the partition wall provided between the air bubble trap cell (2) and the pressure application room (1). One end of the flow path (3) is located under the pressure application room (1), and the other end is located under an air bubble trap cell (2). Though there is no particular limitation about the shape of the flow path (3), it is preferable to make the shape small in the sectional area and slender, so that the flow speed of the discharging liquid is easily raised. At the same time it, is preferable for the flow path (3) to have as small a capacity as possible in order to be able to discharge the air bubble more easily even if the air bubble enters into the flow path.

The capacity of the flow path (3) is a quarter or less of the capacity of the pressure application room (1), and the same as that of the air bubble trap cell (2) or less. Incidentally, the reason why the flow path (3) is provided under both of the other two cells without setting it in parallel to the other two cells is that the whole device is made compact. Therefore, it goes without saying that the two cells and the flow path may be provided in parallel depending on the mode of use.

Figure 2:
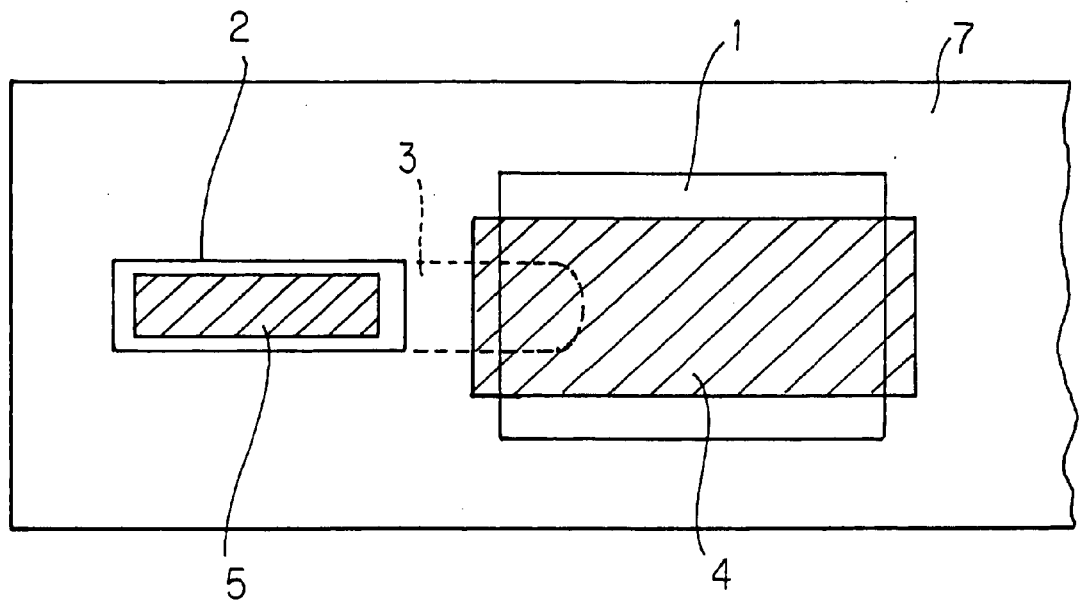
FIG. 2 is a bird's-eye view, schematically showing the locational relation and size of the piezoelectric/electrostrictive membranous elements (4) and (5), a pressure application room (1), a flow path (3) and an air bubble trap cell (2) in an embodiment of a liquid discharge device of the present invention.

FIG. 2 is a bird's-eye view to schematically show the locational relation and size of the piezoelectric/ electrostrictive membranous elements (4) and (5), the pressure application room (1), the flow path (3), and the air bubble trap cell (2) in one embodiment of a liquid discharge device of the present invention. In FIG. 2, (1) denotes a pressure application room, (2) denotes an air bubble trap cell, (3) denotes a flow path arranged in the layer which is located under (1) and (2), (4) denotes a piezoelectric/ electrostrictive membranous element disposed over the pressure application room, and (5) denotes a piezoelectric/ electrostrictive membranous element disposed over the air bubble trap cell (2).

It is preferable to determine the shapes, sizes, and the like,.of the liquid discharge nozzle (9), the minute hole (11) for preventing countercurrent and the minute hole (12) for preventing countercurrent located between and cells (3) and (1) and cells (1) and (8), respectively, so that the relation of $p<p_1<P_2$ can be easily kept between pressure in each cell, so that a trapped air bubble can be easily released. It is preferable that the minute hole (11) for preventing countercurrent between the pressure application room (1) and the flow path (3) is formed so that the diameter (the longitudinal section) becomes slightly narrower toward the flow path (3).

It is preferable that the minute hole (11) for preventing countercurrent and the minute hole (12) for preventing countercurrent have the shape of a circle. In addition, a plurality of the minute holes may be provided per pressure application room, respectively.

Figure 3:
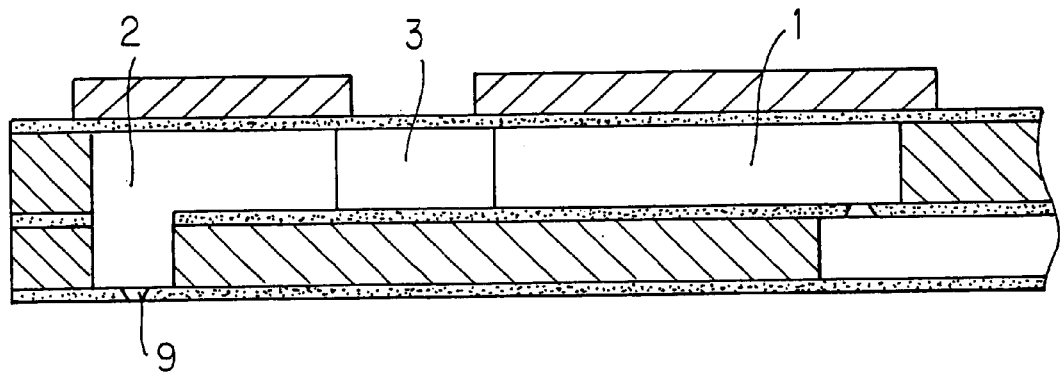
FIG. 3 shows a sectional side elevation of another embodiment according to a liquid discharge device of the present invention.
Figure 4:
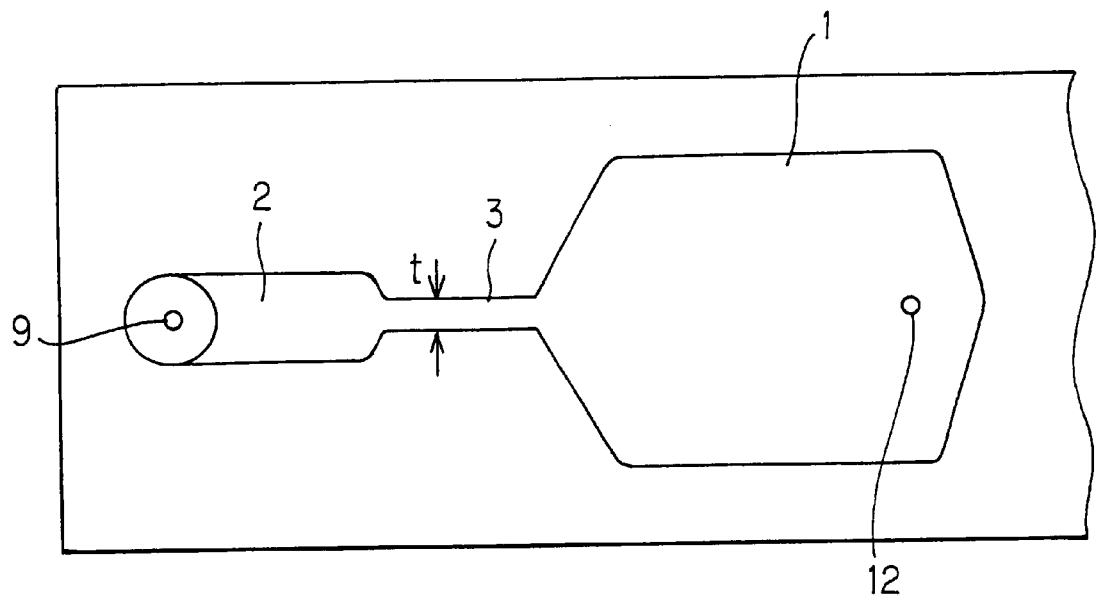
FIG. 4 is a bird's-eye view, schematically showing locational relation and size of a pressure application room (1), a flow path (3) and an air bubble trap cell (2) in another embodiment of a liquid discharge device of the present invention shown in FIG. 3.

As another embodiment of a liquid discharge device of the present invention, a pressure application room (1), an air bubble trap cell (2) and a flow path (3) being disposed in parallel as shown in FIG. 3 is provided. FIG. 3 is a bird's-eye view schematically showing the shapes and the locational relation among the pressure application room (1), the flow path (3) and the air bubble trap cell (2) in another embodiment of a liquid discharge device of the present invention.

An operation example of a liquid discharge device of the present invention is hereinbelow described with reference to FIG. 1, which is a sectional side elevation of a mode of a liquid discharge device of the present invention.

In a liquid discharge device shown in FIG. 1, an air bubble was taken into the cell by reducing the internal pressure of the air bubble trap cell (2) to be lower than the atmospheric pressure, a piezoelectric/ electrostrictive membranous element (4) of the pressure application room (1) was operated in the state, and a predetermined quantity of liquid in the pressure application room (1) was pushed out of the air bubble trap cell (2) into the water via the flow path (3). As a result, discharging of liquid and the release of an air bubble were recognized.

INDUSTRIAL APPLICABILITY

According to a liquid discharge device of the present invention, a trapped air can be securely released.

Incidentally, the device of the present invention is useful as a discharge device upon ion or dry processing of fuel, or for various kinds of liquid where stable discharging of liquid is required. That is, it is preferably used as a liquid discharge device lying liquid raw materials for reaction or drying solutions, including an aimed for medical compositions, or for powder production, or as a device for discharging liquid fuel, such as oil for an oil fan heater.

What is claimed is:

1. A device for discharging a liquid comprising: a structure for discharging said liquid including at least a pressurizing means for discharging said liquid, a pressure chamber, a flow path communicating with said pressure chamber, and an air bubble trap cell communicating with said pressure chamber via said flow path and further communicating with a liquid discharge nozzle.

2. A device for discharging a liquid comprising a plurality of liquid discharge devices according to claim 1.

3. A device for discharging a liquid according to claim 1, wherein said structure includes two layers, said pressure chamber and said air bubble trap cell being positioned in a first layer separated via a partition wall, said flow path communicating with said pressure chamber being positioned in. a second layer located beneath said first layer, wherein one end of said flow path is located beneath said pressure chamber and another end is located beneath said pressure chamber and said air bubble trap cell.

4. A device for discharging a liquid according to claim 1, wherein a ratio of a capacity of said air bubble trap cell to a capacity of said pressure chamber is at least 1:2.

5. A device for discharging a liquid according to claim 3, wherein a ratio of a capacity of said air bubble trap cell to a capacity of said pressure chamber is at least 1:2.

6. A device for discharging a liquid according to claim 3, wherein a ratio of a capacity of said air bubble trap cell to a capacity of said pressure chamber is at least 1:4.

7. A device for discharging a liquid according to claim 1, further comprising a piezoelectric/electrostrictive membranous element positioned above said air bubble trap cell.

8. A device for discharging a liquid according to claim 3, further comprising a piezoelectric/electrostrictive membranous element positioned above said air bubble trap cell.

9. A device for discharging a liquid according to claim 1, wherein the pressure in said air bubble trap cell is less than the pressure in said pressure chamber.

* * * * *